Feb. 28, 1933. C. A. KASTNER 1,899,335
ROTATABLE PAN FOR BREAD BAKING
Filed May 12, 1932
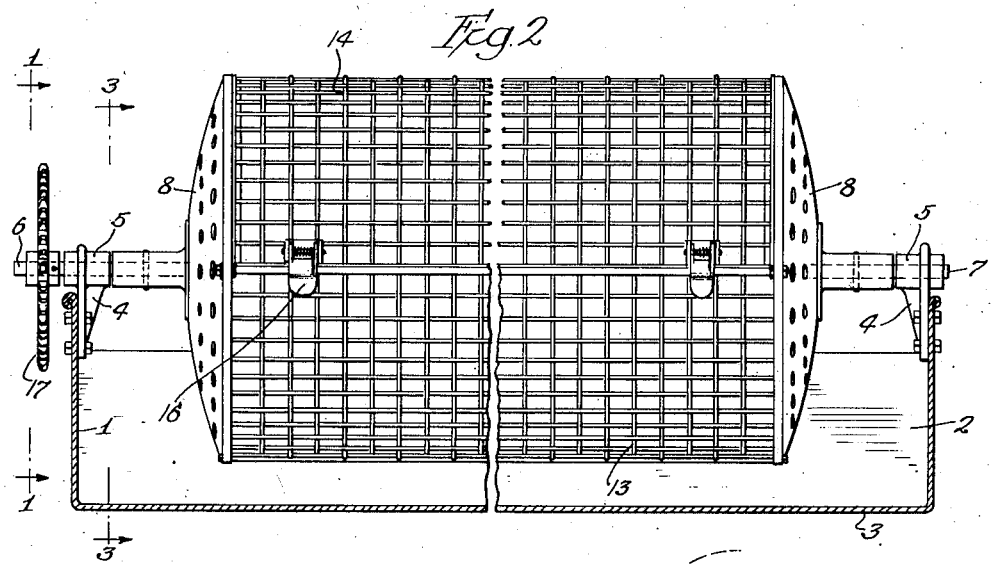
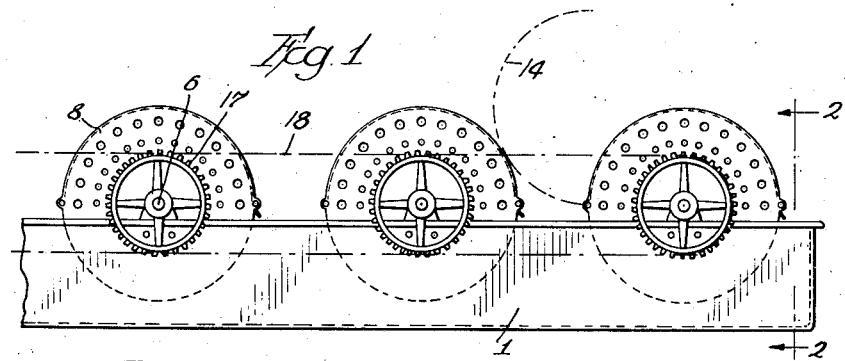
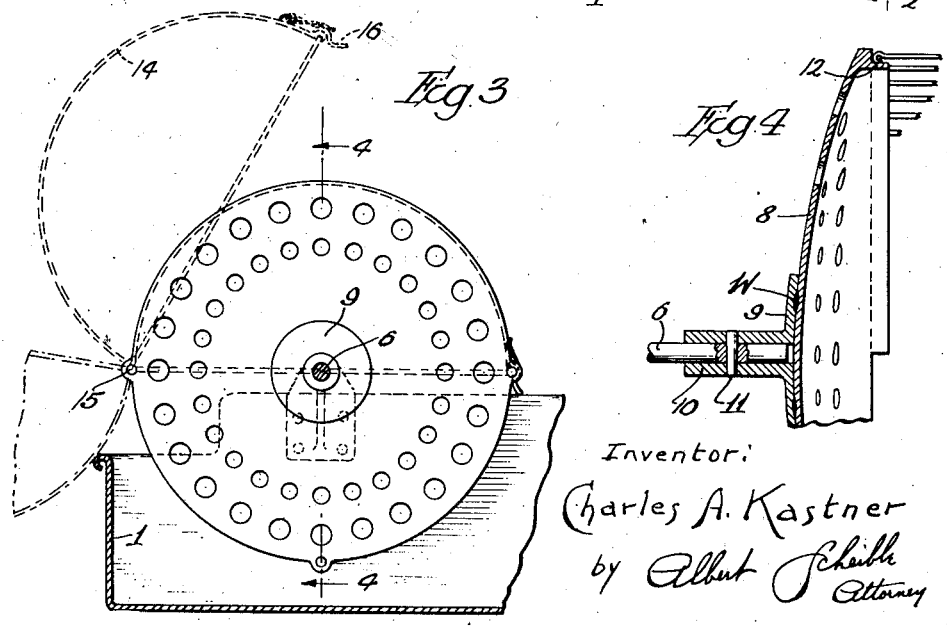
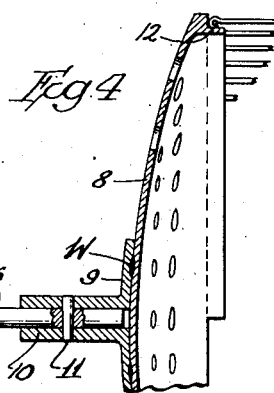
Inventor:
Charles A. Kastner
by Albert Scheible
Attorney Patented Feb. 28, 1933

1,899,335

UNITED STATES PATENT OFFICE

CHARLES A. KASTNER, OF LOUISVILLE, KENTUCKY

ROTATABLE PAN FOR BREAD BAKING

Application filed May 12, 1932. Serial No. 610,771.

My invention relates to means for baking bread in such a manner as to secure a more uniform baking and more uniform texture of the bread throughout the loaf, and in its general objects aims to provide both a novel process or procedure for this purpose and a novel bread-baking appliance whereby this process may be employed advantageously.

In the customary bread-baking procedure, the suitably leavened dough is baked while all except a relatively small upper portion of the dough is housed by an imperforate pan. This pan usually remains in an upright and stationary position during the baking, so that the gases generated within the dough by the heating can only be omitted through the upward face of the dough and to a lesser degree through the relatively small side and end portions of the batch of dough which projects above the pan.

With the emission of the generated gases thus restricted to the ordinary bread-baking pan, the resulting loaf of bread is not uniformly baked in both its upper, intermediate and lower portion. Furthermore, this loaf only has the highly desirable light fluffiness in its upper part; and to prevent the lower part of the bread from being too dense and hard, it is often necessary to carry the lightness and fluffiness of the upper portion of the loaf to a point which makes this portion unduly aerated and apt to sever into fragments when the loaf is sliced.

My present invention aims to overcome these objections by continually rotating the batch of dough during the baking operation while confining the dough within said enclosure which will permit the generated gases to issue in various and changing directions so as to distribute the resulting aeration of the dough substantially evenly throughout the loaf and also to secure a substantially uniform crust on the entire surface of the loaf.

Furthermore, my invention aims to provide inexpensive and easily manipulated means whereby the needed batch of dough can be rotated during the baking to secure the above recited desirable improvements in the resulting loaf.

In a more particular aspect, my invention relates to a rotatable bread pan and to means for rotating the same, and in this aspect includes the providing of a bread pan designed for baking a generally cylindrical loaf and constructed so as to afford the desired uniform aeration while also permitting a convenient inserting of the dough and removal of the baked loaf.

Still further and also more detailed objects will appear from the following specification and from the accompanying drawing, in which drawing Fig. 1 is a fragmentary side elevation of a baking appliance embodying my invention and comprising a plurality of rotatable baking pans jointly supported by a pan-like supporting member, the actuating chain being shown diagrammatically.

Fig. 2 is an enlarged vertical section taken transversely of the said supporting member along the line 2—2 of Fig. 1.

Fig. 3 is a fragmentary vertical section taken longitudinally of the pan-like supporting member along the line 3—3 of Fig. 2, with dotted lines showing a partially open position of the movable part of one of the baking pans, and with other dotted lines partially showing this movable part as swung to its maximum pan-opening position.

Fig. 4 is an enlarged and fragmentary section taken diametric of the axis of rotation of one of the bread-baking pans along the line 4—4 of Fig. 3.

In the illustrated embodiment of my invention, my baking appliance includes rotatable pans designed for baking cylindrical loaves having convexed ends, all of which pans are supported by a supporting member in the form of a rectangular pan having upright ends 1 and sides 2. The sides and ends of this supporting member desirably extend upwardly from the bottom 3 of that member for a distance somewhat less than the diameter of each of the rotatable baking pans. Rigidly fastened to this supporting member are journaling brackets 4, disposed in pairs respectively fastened to the opposite sides 1 of the supporting member, and each two opposed journaling members support alined tubular bearings 5 for respectively journaling the also alined stub shafts 6 and 7 on one of the rotatable baking pans.

As here illustrated, each such rotatable pan includes two alined pan ends 8, desirably of circular contour, which ends preferably are concaved toward each other coaxial with the common axis of the two ends. Each such pan end is fastened (as by welds W) to a flange 9 on the inner end of a tube 10 which extends axially of that pan end and outward of that end, and one of the two stub shafts is socketed in this tube and secured to the tube by a pin 11—as shown in connection with the stub shaft 6 in Fig. 4.

The peripheral wall of each rotatable pan is formed of a foraminous or highly perforated material, as for example wire screening, and preferably is constructed in two parts each extending around half of the circumference of the pan, each such part having its end bearing against cylindrical shoulder 12 which projects inwardly of the pan from the pan ends 8 adjacent to the periphery of these ends as shown in Fig. 4.

One of these screen parts—each of which is shaped to the form of half of a cylindrical tube—is rigidly fastened to both of the pan ends 8 in any suitable manner, as for example by welding, namely the part 13 in Fig. 2. The companion semi-tubular wire screen part 14 is movable and desirably is hingedly connected to the just described rigid assembly of the screen part 13 and the two pan ends, as for example by pivoting the movable screen part 14 on a pivot pin 15 (Fig. 4) which extends through the two pan ends adjacent to one longitudinal edge of the fixed screen part 14. Then I provide releasable means at the juncture of the other two adjacent edges to the two wire screen parts for normally latching these to each other, as for example spring-pressed catches 16 mounted on the movable screen part 14 and adapted to snap over the adjacent longitudinal edge portion of the other screen part 13.

Fastened to each of the stub shafts 6 at the same end of the several rotatable pans is a sprocket 17, desirably disposed outside the supporting member or beyond the adjacent riser side 1 of this member, the sprockets associated with the several rotatable pans being in alinement with each other so that they can intermesh with a single driving chain 18, which chain is shown diagrammatically in Fig. 1.

With my bread-baking appliance thus constructed, each rotatable pan when disposed so that its rigidly fastened part is at the bottom, can have its movable screen part 14 swung open so that the needed batches of the suitably leavened dough can easily be inserted in the pans. To facilitate this, I desirably position one of the rotatable pans at such a distance from the adjacent riser end 1 of the supporting member (as shown in Fig. 3) that the movable screen part 14 of this pan will rest on the upper edge of this riser end as there shown, thereby holding this movable screen part in a full-open position. Then I space the journals for the stub shafts of the other rotatable pans from each other so that the movable screen parts 14 on each of these can bear against the periphery of an adjacent rotatable pan, as shown partly for one of these in dotted lines in Fig. 1.

When the movable screen parts of all of the rotatable baking pans have been snapped shut after each of these pans has received its batch of dough, the entire assemblage can be slid as a unit into the oven, and during the baking time the pans are all slowly rotated by any suitable connection to the driving chain 18.

During this rotation, each pan successively presents different upwardly facing portions of its cylindrical wire screen wall through which the gases generated within the dough will issue, and the perforations in the pan ends also allow some of the gases to issue. Consequently, the resulting loaf of bread is aerated and lightened with substantial uniformity throughout and the crust also is of substantially equal thickness in all surface portions of the loaf, this being particularly true when the length of the rotatable pan is several times the diameter of the pan ends, as here illustrated.

In practice, the user can readily learn the proper quantity of dough suitable for use within a given size of one of my rotatable pans so as to allow for the expansion during the baking without having the dough protrude materially into the meshes of the wire screening. Moreover, since the rotating of the dough during the baking distributes the aeration through all parts of each batch of dough, the latter can initially be considerably stiffer than is customary when stationary baking pans are used, so that the user soon learns how to avoid any catching of surface portions of the baked loaf on either the wire mesh or the perforated end plates.

However, while I have illustrated and described my invention in connection with a baking appliance including numerous desirable details of construction and arrangement, I do not wish to be limited in these respects, since many changes might be made without departing either from the spirit of my invention or from the appended claims.

For example, the size of the apertures in the tubular peripheral wall of my rotatable baking pan may be varied, as also the diameter of the perforations in the end plates, and these latter perforations may even be omitted altogether. Likewise, the operation of my rotatable pans obviously does not depend on the construction of the member which supports the pans, so that I do not wish to be limited to the use of a pan-like member for this purpose.

Neither do I wish to be limited to the uses for which my here disclosed baking appliance is employed, since it would obviously function equally well in the baking of other food products than bread—as for example cakes of various kinds.

I claim as my invention:

1. A rotatable pan for bread-baking, comprising a container having a cylindrical and foraminous peripheral wall, one circumferential half of the said wall being movable with respect to the other half thereof, and having two end plates normally fitting against both halves of the said peripheral wall, one of the said wall halves being fixedly secured to both end plates.

2. A bread-baking pan as per claim 1, in which each of the end plates is provided with perforations distributed circumferentially of the said plates.

3. In an appliance for baking bread or the like, a supporting member, a plurality of rotatable pans journaled upon the said member with their axes horizontal and parallel to one another, sprockets respectively connected to the several pans and each coaxial with one of the pans, and rotating means operatively connecting the several sprockets and including chain portions respectively intermeshed with the several sprockets the supporting member being a rigid pan having its bottom extending freely below all of the rotatable pans and having the rotatable pans journaled upon the end walls of the said pan.

4. A rotatable bread-baking pan including two circular end plates having a common horizontal axis, two wire screen members each spanning edge halves of the two end plates and one thereof fastened to both end plates, means hingedly connecting the other wire screen member at one longitudinal edge thereof to the aforesaid screen member, and releasable means normally latching the other adjacent longitudinal edges of the two wire screen members to each other.

5. The method of baking bread or the like which consists in disposing a batch of dough within a container having a foraminous peripheral wall and having its axis disposed horizontally, and thereafter continuously rotating the said drum about its axis.

6. The method of baking bread or the like which consists in disposing a batch of dough within a container having a foraminous peripheral wall and having its axis disposed horizontally, and also having perforations in the drum ends, and thereafter continuously rotating the drum at a slow rate of revolution so as to permit the upward emission of gases from the dough through the apertures in consecutively different circumferential portions of the said peripheral container wall.

Signed at Louisville, Kentucky, May 7th, 1932.

CHARLES A. KASTNER.